(12) United States Patent
Proctor, Jr. et al.

(10) Patent No.: US 8,111,645 B2
(45) Date of Patent: Feb. 7, 2012

(54) WIRELESS LOCAL AREA NETWORK REPEATER WITH DETECTION

(75) Inventors: James A. Proctor, Jr., Melbourne Beach, FL (US); Kenneth M. Galney, Satellite Beach, FL (US)

(73) Assignee: QUALCOMM Incorporated, San Diego, CA (US)

( * ) Notice: Subject to any disclaimer, the term of this patent is extended or adjusted under 35 U.S.C. 154(b) by 806 days.

(21) Appl. No.: 10/533,589

(22) PCT Filed: Nov. 17, 2003

(86) PCT No.: PCT/US03/35050
§ 371 (c)(1), (2), (4) Date: May 3, 2005

(87) PCT Pub. No.: WO2004/047308
PCT Pub. Date: Jun. 3, 2004

(65) Prior Publication Data
US 2006/0056352 A1    Mar. 16, 2006

Related U.S. Application Data

(60) Provisional application No. 60/426,541, filed on Nov. 15, 2002.

(51) Int. Cl.
*H04B 7/14* (2006.01)
*H04B 1/60* (2006.01)
*H04B 7/00* (2006.01)
*H04B 7/204* (2006.01)

(52) U.S. Cl. .......................... 370/315; 455/9

(58) Field of Classification Search .............. 370/310, 370/315–325, 328; 455/7, 9, 17, 18
See application file for complete search history.

(56) References Cited

U.S. PATENT DOCUMENTS

| | | | |
|---|---|---|---|
| 3,363,250 A | 1/1968 | Jacobson | |
| 4,000,467 A | 12/1976 | Lentz et al. | |
| 4,001,691 A | 1/1977 | Gruenberg | |
| 4,061,970 A | 12/1977 | Magneron et al. | |
| 4,081,752 A * | 3/1978 | Sumi | 455/165.1 |
| 4,124,825 A | 11/1978 | Webb et al. | |
| 4,204,016 A | 5/1980 | Chavannes et al. | |

(Continued)

FOREIGN PATENT DOCUMENTS

CN    1186401    7/1998

(Continued)

OTHER PUBLICATIONS

Code of Federal Regulations. Title 47 Telecommunication: "Federal Communications Commission code part 15.407," Federal Communications Commission vol.1, chapter I. part 15.407.

(Continued)

*Primary Examiner* — Michael Thier
(74) *Attorney, Agent, or Firm* — Linda G. Gunderson

(57) ABSTRACT

A frequency translating repeater (200) for use in a time division duplex radio protocol communications system includes an automatic gain control feature. Detection is performed by comparators (401, 411) ADCs (402, 412); DACs (404, 414) and a processor (315). Detection can be overridden by processor (315) using logic elements (406, 416, 407, and 417) to control the generation of a Channel A/Channel B signal and a PA_ON signal for controlling a power amplifier associated with the transmitter.

62 Claims, 4 Drawing Sheets

U.S. PATENT DOCUMENTS

| | | |
|---|---|---|
| 4,334,323 A | 6/1982 | Moore |
| 4,368,541 A | 1/1983 | Evans |
| 4,509,206 A | 4/1985 | Carpe et al. |
| 4,701,935 A | 10/1987 | Namiki et al. |
| 4,723,302 A | 2/1988 | Fulmer et al. |
| 4,777,653 A | 10/1988 | Bonnerot et al. |
| 4,783,843 A | 11/1988 | Leff et al. |
| 4,820,568 A | 4/1989 | Harpell et al. |
| 4,922,259 A | 5/1990 | Hall et al. |
| 5,023,930 A | 6/1991 | Leslie |
| 5,095,528 A | 3/1992 | Leslie et al. |
| 5,214,788 A | 5/1993 | Delaperriere et al. |
| 5,220,562 A | 6/1993 | Takada et al. |
| 5,280,480 A | 1/1994 | Pitt et al. |
| 5,333,175 A | 7/1994 | Ariyavisitakul et al. |
| 5,341,364 A | 8/1994 | Marra et al. |
| 5,349,463 A | 9/1994 | Hirohashi et al. |
| 5,368,897 A | 11/1994 | Kurihara et al. |
| 5,371,734 A | 12/1994 | Fischer et al. |
| 5,373,503 A | 12/1994 | Chen et al. |
| 5,383,144 A | 1/1995 | Kato |
| 5,408,197 A | 4/1995 | Miyake et al. |
| 5,408,618 A | 4/1995 | Aho et al. |
| 5,430,726 A | 7/1995 | Moorwood et al. |
| 5,446,770 A | 8/1995 | Urabe et al. |
| 5,465,251 A | 11/1995 | Judd et al. |
| 5,471,642 A | 11/1995 | Palmer |
| 5,485,486 A | 1/1996 | Gilhousen et al. |
| 5,509,028 A | 4/1996 | Marque-Pucheu et al. |
| 5,515,376 A | 5/1996 | Murthy et al. |
| 5,519,619 A | 5/1996 | Seda |
| 5,608,755 A | 3/1997 | Rakib et al. |
| 5,610,916 A | 3/1997 | Kostreski et al. |
| 5,648,984 A | 7/1997 | Kroninger et al. |
| 5,654,979 A | 8/1997 | Levin et al. |
| 5,659,879 A | 8/1997 | Dupuy |
| 5,678,177 A | 10/1997 | Beasley |
| 5,678,198 A | 10/1997 | Lemson et al. |
| 5,684,801 A | 11/1997 | Amitay et al. |
| 5,697,052 A * | 12/1997 | Treatch ............................ 455/20 |
| 5,726,980 A | 3/1998 | Rickard et al. |
| 5,732,334 A | 3/1998 | Miyake et al. |
| 5,745,846 A | 4/1998 | Myer et al. |
| 5,754,540 A | 5/1998 | Liu et al. |
| 5,764,636 A | 6/1998 | Edsall et al. |
| 5,767,788 A | 6/1998 | Ness |
| 5,771,174 A | 6/1998 | Spinner et al. |
| 5,784,683 A | 7/1998 | Sistanizadeh et al. |
| 5,794,145 A | 8/1998 | Milam et al. |
| 5,812,933 A | 9/1998 | Niki |
| 5,815,795 A | 9/1998 | Iwai et al. |
| 5,825,809 A | 10/1998 | Sim |
| 5,852,629 A | 12/1998 | Iwamatsu et al. |
| 5,857,144 A | 1/1999 | Mangum et al. |
| 5,862,207 A | 1/1999 | Aoshima |
| 5,875,179 A | 2/1999 | Tikalsky et al. |
| 5,883,884 A | 3/1999 | Atkinson |
| 5,884,181 A | 3/1999 | Arnold et al. |
| 5,890,055 A | 3/1999 | Chu et al. |
| 5,903,553 A | 5/1999 | Sakamoto et al. |
| 5,907,794 A | 5/1999 | Lehmusto et al. |
| 5,963,846 A | 10/1999 | Kurby et al. |
| 5,963,847 A | 10/1999 | Ito et al. |
| 5,987,304 A | 11/1999 | Latt |
| 6,005,855 A | 12/1999 | Zehavi et al. |
| 6,005,884 A | 12/1999 | Cook et al. |
| 6,014,380 A | 1/2000 | Hendel et al. |
| 6,032,194 A | 2/2000 | Gai et al. |
| 6,061,548 A | 5/2000 | Reudink et al. |
| 6,088,570 A | 7/2000 | Komara et al. |
| 6,101,400 A | 8/2000 | Ogaz et al. |
| 6,108,364 A * | 8/2000 | Weaver et al. ................. 375/130 |
| 6,128,512 A | 10/2000 | Trompower et al. |
| 6,128,729 A | 10/2000 | Kimball et al. |
| 6,163,276 A * | 12/2000 | Irving et al. ................. 340/870.4 |
| 6,188,694 B1 | 2/2001 | Fine et al. |
| 6,188,719 B1 | 2/2001 | Collomby |
| 6,195,051 B1 | 2/2001 | McCoy et al. |
| 6,202,114 B1 | 3/2001 | Dutt et al. |
| 6,215,982 B1 | 4/2001 | Trompower et al. |
| 6,219,739 B1 | 4/2001 | Dutt et al. |
| 6,222,503 B1 | 4/2001 | Gietema et al. |
| 6,272,351 B1 | 8/2001 | Langston et al. |
| 6,285,863 B1 | 9/2001 | Zhang et al. |
| 6,298,061 B1 | 10/2001 | Chin et al. |
| 6,304,563 B1 | 10/2001 | Blessent et al. |
| 6,304,575 B1 | 10/2001 | Carroll et al. |
| 6,331,792 B1 | 12/2001 | Tonietto et al. |
| 6,339,694 B1 | 1/2002 | Komara et al. |
| 6,342,777 B1 | 1/2002 | Takahashi et al. |
| 6,363,068 B1 | 3/2002 | Kinoshita et al. |
| 6,370,185 B1 | 4/2002 | Schmutz et al. |
| 6,370,369 B1 | 4/2002 | Kraiem et al. |
| 6,377,612 B1 | 4/2002 | Baker et al. |
| 6,377,640 B2 | 4/2002 | Trans et al. |
| 6,384,765 B1 | 5/2002 | Sjostrand et al. |
| 6,385,181 B1 | 5/2002 | Tsutsui et al. |
| 6,388,995 B1 | 5/2002 | Gai et al. |
| 6,393,299 B1 | 5/2002 | Mizumoto et al. |
| 6,404,775 B1 * | 6/2002 | Leslie et al. ................. 370/466 |
| 6,441,781 B1 * | 8/2002 | Rog et al. ................. 342/357.12 |
| 6,473,131 B1 | 10/2002 | Neugebauer et al. |
| 6,480,481 B1 | 11/2002 | Park et al. |
| 6,501,955 B1 | 12/2002 | Durrant et al. |
| 6,535,732 B1 | 3/2003 | McIntosh et al. |
| 6,539,028 B1 | 3/2003 | Soh et al. |
| 6,539,204 B1 | 3/2003 | Marsh et al. |
| 6,549,542 B1 | 4/2003 | Dong et al. |
| 6,549,567 B1 | 4/2003 | Fullerton et al. |
| 6,563,468 B2 | 5/2003 | Hill et al. |
| 6,574,198 B1 * | 6/2003 | Petersson ...................... 370/252 |
| 6,628,624 B1 | 9/2003 | Mahajan et al. |
| 6,664,932 B2 | 12/2003 | Sabet et al. |
| 6,671,502 B1 | 12/2003 | Ogawa et al. |
| 6,684,058 B1 | 1/2004 | Karacaoglu et al. |
| 6,690,657 B1 | 2/2004 | Lau et al. |
| 6,694,125 B2 | 2/2004 | Andrews, Jr. et al. |
| 6,718,160 B2 | 4/2004 | Schmutz et al. |
| 6,728,541 B2 | 4/2004 | Ohkura |
| 6,766,113 B1 | 7/2004 | Al-Salameh et al. |
| 6,781,544 B2 | 8/2004 | Saliga et al. |
| 6,788,256 B2 | 9/2004 | Hollister |
| 6,880,103 B2 | 4/2005 | Kim et al. |
| 6,888,881 B1 | 5/2005 | Nagano |
| 6,904,266 B1 | 6/2005 | Jin et al. |
| 6,906,669 B2 | 6/2005 | Sabet et al. |
| 6,934,511 B1 | 8/2005 | Lovinggood et al. |
| 6,934,555 B2 | 8/2005 | Silva et al. |
| 6,944,139 B1 | 9/2005 | Campanella et al. |
| 6,957,042 B2 | 10/2005 | Williams |
| 6,983,162 B2 | 1/2006 | Garani et al. |
| 6,985,516 B1 | 1/2006 | Easton et al. |
| 6,990,313 B1 | 1/2006 | Yarkosky et al. |
| 7,027,418 B2 | 4/2006 | Gan et al. |
| 7,027,770 B2 | 4/2006 | Judd et al. |
| 7,043,203 B2 | 5/2006 | Miquel et al. |
| 7,050,452 B2 | 5/2006 | Sugar et al. |
| 7,058,071 B1 | 6/2006 | Myles et al. |
| 7,058,368 B2 | 6/2006 | Nicholls et al. |
| 7,088,734 B2 | 8/2006 | Newberg et al. |
| 7,103,344 B2 | 9/2006 | Menard et al. |
| 7,120,930 B2 | 10/2006 | Maufer et al. |
| 7,123,670 B2 | 10/2006 | Gilbert et al. |
| 7,123,676 B2 | 10/2006 | Gebara et al. |
| 7,132,988 B2 | 11/2006 | Yegin et al. |
| 7,133,391 B2 | 11/2006 | Belcea |
| 7,133,460 B2 | 11/2006 | Bae et al. |
| 7,139,527 B2 | 11/2006 | Tamaki et al. |
| 7,167,526 B2 | 1/2007 | Liang et al. |
| 7,187,904 B2 | 3/2007 | Gainey et al. |
| 7,193,975 B2 | 3/2007 | Tsutsumi et al. |
| 7,194,275 B2 | 3/2007 | Bolin et al. |
| 7,200,134 B2 | 4/2007 | Proctor, Jr. et al. |
| 7,215,964 B2 | 5/2007 | Miyake et al. |
| 7,233,771 B2 | 6/2007 | Proctor, Jr. et al. |
| 7,248,645 B2 | 7/2007 | Vialle et al. |
| 7,254,132 B2 | 8/2007 | Takao et al. |

| Patent No. | Kind | Date | Inventor |
|---|---|---|---|
| 7,299,005 | B1 | 11/2007 | Yarkosky et al. |
| 7,315,573 | B2* | 1/2008 | Lusky et al. .................. 375/224 |
| 7,319,714 | B2 | 1/2008 | Sakata et al. |
| 7,321,787 | B2 | 1/2008 | Kim et al. |
| 7,339,926 | B2 | 3/2008 | Stanwood et al. |
| 7,352,696 | B2 | 4/2008 | Stephens et al. |
| 7,409,186 | B2 | 8/2008 | Van Buren et al. |
| 7,430,397 | B2 | 9/2008 | Suda et al. |
| 7,450,936 | B2 | 11/2008 | Kim et al. |
| 7,457,587 | B2 | 11/2008 | Chung |
| 7,486,929 | B2 | 2/2009 | Van Buren et al. |
| 7,577,398 | B2 | 8/2009 | Judd et al. |
| 7,590,145 | B2 | 9/2009 | Futch et al. |
| 7,623,826 | B2 | 11/2009 | Pergal et al. |
| 7,676,194 | B2 | 3/2010 | Rappaport et al. |
| 7,729,669 | B2 | 6/2010 | Van Buren et al. |
| 2001/0018328 | A1 | 8/2001 | Ohkura et al. |
| 2001/0031646 | A1 | 10/2001 | Williams et al. |
| 2001/0040699 | A1 | 11/2001 | Osawa et al. |
| 2001/0050580 | A1 | 12/2001 | O'toole et al. |
| 2001/0050906 | A1 | 12/2001 | Odenwalder et al. |
| 2001/0054060 | A1 | 12/2001 | Fillebrown et al. |
| 2002/0004924 | A1 | 1/2002 | Kim et al. |
| 2002/0018487 | A1 | 2/2002 | Chen et al. |
| 2002/0034958 | A1 | 3/2002 | Oberschmidt et al. |
| 2002/0045461 | A1 | 4/2002 | Bongfeldt et al. |
| 2002/0061031 | A1 | 5/2002 | Sugar et al. |
| 2002/0089945 | A1 | 7/2002 | Belcea et al. |
| 2002/0101843 | A1 | 8/2002 | Sheng et al. |
| 2002/0102948 | A1 | 8/2002 | Stanwood et al. |
| 2002/0109585 | A1 | 8/2002 | Sanderson |
| 2002/0115409 | A1 | 8/2002 | Khayrallah et al. |
| 2002/0119783 | A1 | 8/2002 | Bourlas et al. |
| 2002/0136268 | A1 | 9/2002 | Gan et al. |
| 2002/0141435 | A1 | 10/2002 | Newberg et al. |
| 2002/0159506 | A1 | 10/2002 | Alamouti et al. |
| 2002/0163902 | A1 | 11/2002 | Takao et al. |
| 2002/0177401 | A1 | 11/2002 | Judd et al. |
| 2003/0026363 | A1 | 2/2003 | Stoter et al. |
| 2003/0063583 | A1 | 4/2003 | Padovani et al. |
| 2003/0124976 | A1 | 7/2003 | Tamaki et al. |
| 2003/0139175 | A1 | 7/2003 | Kim et al. |
| 2003/0179734 | A1 | 9/2003 | Tsutsumi et al. |
| 2003/0185163 | A1 | 10/2003 | Bertonis et al. |
| 2003/0211828 | A1 | 11/2003 | Dalgleish et al. |
| 2003/0235170 | A1 | 12/2003 | Trainin et al. |
| 2003/0236069 | A1 | 12/2003 | Sakata et al. |
| 2004/0029537 | A1 | 2/2004 | Pugel et al. |
| 2004/0038707 | A1 | 2/2004 | Kim et al. |
| 2004/0047333 | A1 | 3/2004 | Han et al. |
| 2004/0047335 | A1 | 3/2004 | Proctor, Jr. et al. |
| 2004/0110469 | A1 | 6/2004 | Judd et al. |
| 2004/0131025 | A1 | 7/2004 | Dohler et al. |
| 2004/0146013 | A1 | 7/2004 | Song et al. |
| 2004/0157551 | A1* | 8/2004 | Gainey et al. ................ 455/11.1 |
| 2004/0166802 | A1 | 8/2004 | McKay, Sr. et al. |
| 2004/0176050 | A1 | 9/2004 | Steer et al. |
| 2004/0198295 | A1 | 10/2004 | Nicholls et al. |
| 2004/0208258 | A1 | 10/2004 | Lozano et al. |
| 2004/0218683 | A1 | 11/2004 | Batra et al. |
| 2004/0229563 | A1 | 11/2004 | Fitton et al. |
| 2004/0235417 | A1 | 11/2004 | Dean |
| 2004/0248581 | A1 | 12/2004 | Seki et al. |
| 2004/0264511 | A1 | 12/2004 | Futch et al. |
| 2005/0014464 | A1 | 1/2005 | Larsson et al. |
| 2005/0030891 | A1 | 2/2005 | Stephens et al. |
| 2005/0042999 | A1 | 2/2005 | Rappaport et al. |
| 2005/0130587 | A1 | 6/2005 | Suda et al. |
| 2005/0190822 | A1 | 9/2005 | Fujii et al. |
| 2005/0201315 | A1 | 9/2005 | Lakkis et al. |
| 2005/0254442 | A1 | 11/2005 | Proctor, Jr. et al. |
| 2005/0286448 | A1 | 12/2005 | Proctor et al. |
| 2006/0028388 | A1 | 2/2006 | Schantz |
| 2006/0035643 | A1 | 2/2006 | Vook et al. |
| 2006/0041680 | A1 | 2/2006 | Proctor, Jr. et al. |
| 2006/0052066 | A1 | 3/2006 | Cleveland et al. |
| 2006/0052099 | A1 | 3/2006 | Parker et al. |
| 2006/0063484 | A1 | 3/2006 | Proctor et al. |
| 2006/0063485 | A1 | 3/2006 | Gainey et al. |
| 2006/0098592 | A1 | 5/2006 | Proctor, Jr. et al. |
| 2006/0183421 | A1 | 8/2006 | Proctor et al. |
| 2006/0203757 | A1 | 9/2006 | Young et al. |
| 2006/0262026 | A1 | 11/2006 | Gainey et al. |
| 2007/0025349 | A1 | 2/2007 | Bajic et al. |
| 2007/0025486 | A1 | 2/2007 | Gainey et al. |
| 2007/0032192 | A1 | 2/2007 | Gainey et al. |
| 2007/0121546 | A1 | 5/2007 | Zuckerman et al. |
| 2007/0286110 | A1 | 12/2007 | Proctor et al. |
| 2008/0057862 | A1 | 3/2008 | Smith et al. |
| 2008/0233942 | A9 | 9/2008 | Kim et al. |

FOREIGN PATENT DOCUMENTS

| | | | |
|---|---|---|---|
| EP | 0523687 | | 1/1993 |
| EP | 0709973 | A1 | 5/1996 |
| EP | 0715423 | | 6/1996 |
| EP | 0847146 | A2 | 6/1998 |
| EP | 0853393 | A1 | 7/1998 |
| EP | 0860953 | | 8/1998 |
| GB | 2272599 | | 5/1994 |
| GB | 2351420 | A | 12/2000 |
| JP | 62040895 | | 2/1987 |
| JP | 63160442 | | 7/1988 |
| JP | 64011428 | | 1/1989 |
| JP | 02100358 | | 4/1990 |
| JP | 03021884 | | 1/1991 |
| JP | 05063623 | | 3/1993 |
| JP | 05102907 | | 4/1993 |
| JP | 06013947 | | 1/1994 |
| JP | 06334577 | | 12/1994 |
| JP | 07030473 | | 1/1995 |
| JP | 07-079187 | | 3/1995 |
| JP | 07079205 | | 3/1995 |
| JP | 7131401 | | 5/1995 |
| JP | 08-097762 | | 4/1996 |
| JP | 08274706 | | 10/1996 |
| JP | 09018484 | A | 1/1997 |
| JP | 9130322 | A | 5/1997 |
| JP | 09-162903 | | 6/1997 |
| JP | 9162801 | | 6/1997 |
| JP | 09182155 | | 7/1997 |
| JP | 09214418 | | 8/1997 |
| JP | 10032557 | A | 2/1998 |
| JP | 10107727 | | 4/1998 |
| JP | 10135892 | | 5/1998 |
| JP | 11055713 | | 2/1999 |
| JP | 11127104 | | 5/1999 |
| JP | 11298421 | A | 10/1999 |
| JP | 2000031877 | | 1/2000 |
| JP | 2000502218 | T | 2/2000 |
| JP | 2000082983 | A | 3/2000 |
| JP | 2000236290 | | 8/2000 |
| JP | 200269873 | | 9/2000 |
| JP | 2001016152 | | 1/2001 |
| JP | 2001111575 | A | 4/2001 |
| JP | 2001136115 | A | 5/2001 |
| JP | 2002033691 | | 1/2002 |
| JP | 2002111571 | A | 4/2002 |
| JP | 2002271255 | | 9/2002 |
| JP | 2003174394 | | 6/2003 |
| JP | 2003198442 | | 7/2003 |
| JP | 2003244050 | | 8/2003 |
| JP | 2004056210 | A | 2/2004 |
| JP | 2004328666 | | 11/2004 |
| JP | 2005072646 | | 3/2005 |
| JP | 2005110150 | A | 4/2005 |
| JP | 2005236626 | A | 9/2005 |
| JP | 2005531202 | | 10/2005 |
| JP | 2005531265 | | 10/2005 |
| JP | 2006503481 | | 1/2006 |
| JP | 2006505146 | | 2/2006 |
| KR | 100610929 | | 8/2006 |
| RU | 2120702 | C1 | 10/1998 |
| WO | WO92/14339 | | 8/1992 |
| WO | WO9715991 | | 5/1997 |
| WO | WO97/034434 | | 9/1997 |
| WO | WO98/58461 | A1 | 12/1998 |
| WO | WO99/59264 | A2 | 11/1999 |
| WO | WO00/50971 | A2 | 8/2000 |

| | | |
|---|---|---|
| WO | WO01/52447 | 7/2001 |
| WO | WO01/82512 A1 | 11/2001 |
| WO | WO0199308 | 12/2001 |
| WO | 0208857 | 1/2002 |
| WO | 0217572 | 2/2002 |
| WO | WO03/013005 A2 | 2/2003 |
| WO | 04002014 | 12/2003 |
| WO | WO2004/001986 A2 | 12/2003 |
| WO | WO2004001892 A2 | 12/2003 |
| WO | WO2004002014 | 12/2003 |
| WO | WO2004004365 | 1/2004 |
| WO | WO2004/032362 | 4/2004 |
| WO | WO2004036789 | 4/2004 |
| WO | WO2004/038958 | 5/2004 |
| WO | WO2004062305 A1 | 7/2004 |
| WO | WO2005115022 | 12/2005 |

OTHER PUBLICATIONS

IEEE Std 802.11-1999 (Reaff 2003), "Part 11: Wireless LAN Medium Access Control (MAC) and Physical Layer (PHY) Specifications," LAN MAN Standards Committee of the IEEE Computer Society; Paragraphs 7.2.3.1 and 7.2.3.9; Paragraph 7.3.2.4; Paragraphs 15.4.6.2 and 18.4.6.2.

IEEE Std 802.11b-1999. "Part 11: Wireless LAN Medium Access Control (MAC) and Physical Layer (PHY) specifications: Higher-Speed Physical Layer Extension in the 2.4 GHz Band," IEEE-SA Standards Board, Supplement to ANSI/IEEE Std. 802.11, 1999 Edition, Approved Sep. 16, 1999.

IEEE Std 802.11g-2003, "Part 11: Wireless LAN Medium Access Control (MAC) and Physical Layer (PHY) specifications: Amendment 4: Further. Higher Data Rate Extension in the 2.4 GHz Band," IEEE Computer Society, Published by The Institute of Electrical and Electronics Engineers. Inc., Jun. 27, 2003.

IEEE Std 802.16-2001; "Part 16: Air Interface for Fixed Broadband Wireless Access Systems," IEEE Computer Society and the IEEE Microwave Theory and Techniques Society, Published by The Institute of Electrical and Electronics Engineers, Inc., Apr. 8, 2002.

Andrisano, et al., On the Spectral Efficiency of CPM Systems over Real Channel in the Presence of Adjacent Channel and CoChannel Interference: A Companrison between Partial and Full Response Systems, IEEE Transactions on Vehicular Technology, vol. 39, No. 2, May 1990.

First Office Action issued from the Chinese Patent Office in connection with corresponding Chinese application No. 200380101286.2. (corresponding U.S. Appl. No. 10/530,546).

Draft Corrigendum to IEEE Standard for Local and Metropolitan Area Networks- Part 16: Air Interface for Fixed Broadband Wireless Access Systems, IEEE P802.16-2004/Cor1/D5.

Draft IEEE Standard for Local and Metropolitan Area Networks- Part 16: Air Interface for Fixed and Mobile Broadband Wireless Access Systems; Amendment for Physical and Medium Access Control Layers for Combined Fixed and Mobile Operation in Licensed Bands.

First Report issued by IP Australia on Jul. 31, 2007 in connection with the corresponding Australian application No. 2003239577. (corresponding U.S. Appl. No. 10/516,327).

IEEE 802.16(e) Part 16: Air Interface for Fixed Broadband Wireless Access Systems, 2005, Sections 8.4.10.2.1; 8.4.10.3.2.

International Search Report-PCT/US2003/035050, International Searching Authority/US-Alexandria, Virginia-May 21, 2004 (080588WO).

Kannangara, et al., "Analysis of an Adaptive Wideband Duplexer with Double-Loop Cancellation," IEEE Transactions on Vehicular Technology, vol. 56, No. 4, Jul. 2007, pp. 1971-1982.

Kutlu, et al,. "Performance Analysis of MAC Protocols for Wireless Control Area Network," 1996 IEEE, pp. 494-499.

Mexican Office communication dated Jul. 2, 2007 issued from Mexican Patent Office for application PA/a/2004/011588 with partial translation thereof. (corresponding U.S. Appl. No. 10/516,327).

Notification of the First Office Action from Chinese Patent Office dates Sep. 8, 2006 for the corresponding Chinese patent application No. 200380105267.7. (corresponding U S. Appl. No. 10/536,471).

Office Action issued from the Mexican Patent Office dated Feb. 22, 2008 in connection with the corresponding Mexican Patent Application No. PA/a/2004/011588, (corresponding U.S. Appl. No. 10/516,327).

Office communication dated Jan. 12, 2007 issued from the European Patent Office for counterpart application No. 03734136.9-1246. (corresponding U.S. Appl. No. 10/516,327).

Office communication dated Oct. 19, 2006 issued from the Mexican Patent Office for counterpart application No. PA/a/2004/011588. (corresponding U.S. Appl. No. 10/516,327).

Official communication issued from the European Patent Office dated Aug. 7, 2007 for the corresponding European patent application No. 03759271.4-2412. (corresponding U.S. Appl. No. 10/531,078).

Official communication issued from the European Patent Office dated Dec. 19, 2006 for the corresponding European patent application No. 03759271.4-2412. (corresponding U.S. Appl. No. 10/531,078).

Second Office Action issued from the Chinese Patent Office on Jul. 20, 2007 in connection with corresponding Chinese application No. 200380101286.2. (corresponding U.S. Appl. No. 10/530,546).

Specifications for2.3 GHz Band Portable Internet Service—Physical & Medium Access Control Layer, TTAS.KO-06.0082/R1, Dec. 2005.

Third Office Action issued from the Patent Office of People's Republic of China dated Jan. 4, 2008 in corresponding Chinese Patent Application No. 200380101286.2. (corresponding U.S. Appl. No. 10/530,546).

Translation of Office Action issued by Chinese Patent Office on Oct. 19, 2007 in connection with the corresponding Chinese application No. 03814391.7. (corresponding U.S. Appl. No. No. 10/516,327).

U.S. PTO Office Action mailed on Apr. 17, 2007 for the corresponding parent U.S. Appl. No. 11/339,838, now U.S. Patent No. 7,230,935.

U.S. PTO Office Action mailed on Jan. 24, 2007 for the corresponding parent patent U.S. Appl. No. 11/339,838, now U.S. Patent No. 7,230,935.

U.S. PTO Office Action mailed Nov. 21, 2006 for the corresponding parent patent U.S. Appl. No. 11/339,838, now U.S. Patent No. 7,230,935.

U.S. PTO Office Action mailed Nov. 6, 2006 for the corresponding parent patent U.S. Appl. No. 11/339,838, now U.S. Patent No. 7,230,935.

Draft IEEE Standard for Local and Metropolitan Area Networks— Part 16: Air Interface for Fixed and Mobile Broadband Wireless Access System. Amendment for Physical and Medium Access Control Layers for Combined Fixed and Mobile Operation in Licensed Bands. IEEE P802.16E/D12, Oct. 2005.

Office Action English translation dated Jul. 4, 2008 issued from Japanese Patent Office for Application No. 03814391.7.

Office Action English translation dated Jun. 29, 2009 issued from Japanese Patent Office for Application No. 2004-541532.

Supplementary European Search Report—EP03781739, Search Authority—Munich Patent Office, May 7, 2010.

Translation of Office Action in Japanese application 2004-515701, corresponding to U.S. Appl. No. 10/516,327, citing WO00050971, JP2000-031877, JP2002-033691, JP2002-111571 and JP11-127104. Dated May 5, 2010.

Translation of Office Action in Japanese application 2004-544751, corresponding to U.S. Appl. No. 10/531,078, citing W000050971, JP2002-111571, JP05-102907, JP63-160442, JP2000-502218, JP10-032557 and JP2000-082983. Dated Aug. 25, 2009.

Translation of Office Action in Japanese application 2004-553510, corresponding to U.S. Appl. No. 10/533,589, citing W000050971, JP09-182155, JP64-011428 and JP62-040895. Dated Sep. 29, 2009.

Translation of Office Action in Japanese application 2004-565505, corresponding to U.S. Appl. No. 10/563,471 citing JP08-097762 and JP2001-11575. Dated Aug. 11, 2009.

Translation of Office Action in Japanese application 2004-565505, corresponding to U.S. Appl. No. 10/563,471, citing JP08-097762, JP2001-111575, JP09-018484 and JP11-055713. Dated Sep. 14, 2010.

Translation of Office Action in Japanese application 2004-565505, corresponding to U.S. Appl. No. 10/563,471, citing JP09-018484. Dated Feb. 23, 2010.

Translation of Office Action in Korean application 2008-7026775, corresponding to U.S. Appl. No. 11/730,361, citing KR100610929 Dated Aug. 30, 2010.

Translation of Office Action in Japanese application 2007-513349 corresponding to US application 11/546,242, citing W004032362, W02004001986, JP09214418, JP07131401, JP2004056210, JP2000082983, JP09130322, JP2003244050, JP2003198442, US6377612, JP2006503481, JP2002111571, JP09162801, JP2005531202, W02004001892 and JP10107727 dated Nov. 16, 2010 (080592JP).

Translation of Office Action in Japanese application 2009-503041, corresponding to US application 11/730,361, citing W005115022, JP10-135892, JP2005-531265, 2006- 503481, JP2005-531202 and JP2006-505146. Dated Oct. 26, 2010 (080600JP).

Translation of Office Action in Japanese application 2009-526736 corresponding to US application 12/307,801 , citing US20040110469, US20060019603, JP2005072646, JP2001016152, JP11298421, JP2001136115, JP2005110150, JP2005236626, W09715991 and W00199308 dated Jan. 4, 2011 (080606JP).

Translation of Office Action in Korean application 2009-7010639, corresponding to US application 12/439,018, citing W001052447 and US2004/0208258, Dated Nov. 15, 2010 (080608KR).

* cited by examiner

WIRELESS LOCAL AREA NETWORK REPEATER WITH DETECTION

CROSS REFERENCE TO RELATED APPLICATIONS

This application is related to and claims priority from pending U.S. Provisional Application No. 60/426,541 filed Nov. 15, 2002, and is further related to PCT Application PCT/US03/16208 entitled WIRELESS LOCAL AREA NETWORK REPEATER, the contents of which are incorporated herein by reference.

BACKGROUND OF THE INVENTION

The present invention relates generally to wireless local area networks (WLANs) and, particularly, the present invention relates to dynamic frequency detection in a frequency translating repeater.

Several standard protocols for wireless local area networks, commonly referred to as WLANs, are becoming popular. These include protocols such as 802.11 (as set forth in the 802.11 wireless standards), home RF, and Bluetooth. The standard wireless protocol with the most commercial success to date is the 802.11b protocol although next generation protocols, such as 802.11g, are also gaining popularity.

While the specifications of products utilizing the above standard wireless protocols commonly indicate data rates on the order of, for example, 11 MBPS and ranges on the order of, for example, 100 meters, these performance levels are rarely, if ever, realized. Performance shortcomings between actual and specified performance levels have many causes including attenuation of the radiation paths of RF signals, which for 802.11b are in the range of 2.4 GHz in an operating environment such as an indoor environment. Access point to client ranges are generally less than the coverage range required in a typical home, and may be as little as 10 to 15 meters. Further, in structures having split floor plans, such as ranch style or two story homes, or those constructed of materials capable of attenuating RF signals, areas in which wireless coverage is needed may be physically separated by distances outside of the range of, for example, an 802.11 protocol based system. Attenuation problems may be exacerbated in the presence of interference in the operating band, such as interference from other 2.4 GHz devices or wideband interference with in-band energy. Still further, data rates of devices operating using the above standard wireless protocols are dependent on signal strength. As distances in the area of coverage increase, wireless system performance typically decreases. Lastly, the structure of the protocols themselves may affect the operational range.

Repeaters are commonly used in the mobile wireless industry to increase the range of wireless systems. However, problems and complications arise in that system receivers and transmitters in any given device operate at the same frequency in a WLAN utilizing, for example, 802.11 WLAN or 802.16 WMAN wireless protocols. In such systems, when multiple transmitters operate simultaneously, as would be the case in repeater operation, difficulties arise. Typical WLAN protocols provide no defined receive and transmit periods and, thus, because random packets from each wireless network node are spontaneously generated and transmitted and are not temporally predictable, packet collisions may occur. Some remedies exist to address such difficulties, such as, for example, collision avoidance and random back-off protocols, which are used to avoid two or more nodes transmitting packets at the same time. Under 802.11 standard protocol, for example, a distributed coordination function (DCF) may be used for collision avoidance.

Such operation is significantly different than the operation of many other cellular repeater systems, such as those systems based on IS-136, IS-95 or IS-2000 standards, where the receive and transmit bands are separated by a duplexing frequency offset. Frequency division duplexing (FDD) operation simplifies repeater operation since conflicts associated with repeater operation, such as those arising in situations where the receiver and transmitter channels are on the same frequency for both the uplink and the downlink, are not present.

Other cellular mobile systems separate receive and transmit channels by time rather than by frequency and further utilize scheduled times for specific uplink/downlink transmissions. Such operation is commonly referred to as time division duplexing (TDD). Repeaters for these systems are more easily built, as the transmission and reception times are well known and are broadcast by a base station. Receivers and transmitters for these systems may be isolated by any number of means including physical separation, antenna patterns, or polarization isolation. Even for these systems, the cost and complexity of a repeater may be greatly reduced by not offering the known timing information that is broadcast, thus allowing for more economically feasible repeaters. That being said, the techniques described herein may be combined with broadcast channel assignment information to aid the repeater in determining uplink and downlink timings, which may be required for centrally controlled TDD systems such as 802.20 or 802.16.

Thus, WLAN repeaters operating on the same frequencies have unique constraints due to the above spontaneous transmission capabilities and therefore require a unique solution. Since these repeaters use the same frequency for receive and transmit channels, some form of isolation must exist between the receive and transmit channels of the repeater. While some related systems such as, for example, CDMA systems used in wireless telephony, achieve channel isolation using sophisticated techniques such as directional antennas, physical separation of the receive and transmit antennas, or the like, such techniques are not practical for WLAN repeaters in many operating environments such as in the home where complicated hardware or lengthy cabling is not desirable or may be too costly.

One system, described in International Application No. PCT/US03/16208 and commonly owned by the assignee of the present application, resolves many of the above identified problems by providing a repeater which isolates receive and transmit channels using a frequency detection and translation method. The WLAN repeater described therein allows two WLAN units to communicate by translating packets associated with one device at a first frequency channel to a second frequency channel used by a second device. The direction associated with the translation or conversion, such as from the frequency associated with the first channel to the frequency associated with the second channel, or from the second channel to the first channel, depends upon a real time configuration of the repeater and the WLAN environment. The WLAN repeater may be configured to monitor both channels for transmissions and, when a transmission is detected, translate the received signal at the first frequency to the other channel, where it is transmitted at the second frequency.

The above described approach solves both the isolation issue and the spontaneous transmission problems as described above by monitoring and translating in response to packet transmissions and may further be implemented in a small inexpensive unit. However, a WLAN repeater in order to operate effectively must be capable of rapidly detecting the presence of a signal on one of at least two frequency channels used within the frequency translating repeater.

SUMMARY OF THE INVENTION

Accordingly, in various exemplary and alternative exemplary embodiments, the present invention extends the coverage area in a wireless environment such as a WLAN environment, and, broadly speaking, in any time division duplex system including IEEE 802.16, IEEE 802.20 and TDS-CDMA, with a dynamic frequency detection method. An exemplary WLAN frequency translating repeater allows two WLAN nodes or units to communicate by translating packets from a first frequency channel used by one device to a second frequency channel used by a second device. The direction of the conversion from channel 1 to channel 2, versus from channel 2 to channel 1, is dependent upon real time configuration. The repeater may preferably monitor both channels for transmissions, and when a transmission on a channel is detected, the repeater is configured to translate the received signal to the other channel, where it is transmitted.

In accordance with various exemplary embodiments, the presence of a signal on one of at least two channels must be detected with very little delay. Rapid signal detection can be difficult if processing is performed by an analog to digital converter (ADC) and a digital processor. Pipeline delays associated with the ADC and additional delays associated with the processor create obstacles to rapid detection.

RF in circuit propagation delays may be used to facilitate rapid detection by allowing analog storage of received waveforms while signal detection and transmitter configuration take place. Signal detection may be performed prior to the expiration of RF delay periods, thereby providing additional time to perform the required configuration for the system.

Detection of received waveforms is preferably accomplished using logarithmic amplifiers (log amps) as will be described in greater detail herein after. Outputs from log amps are fed to an ADC and then to a processor. As will be appreciated, the delay associated with such an architecture drives the cost and performance of an exemplary repeater. One benefit of using an ADC in connection with a processor is the ability to convert analog signals and the ability to add additional intelligence to the detection process, but at the cost of additional delay and expense. Thus, an alternative to such an architecture is an architecture whereby fast analog detectors work in connection with a supervisory processor which can override decisions made by fast analog detection portions.

RF delays are preferably implemented using Surface Acoustic Wave (SAW) filters. SAW filters provide the capability to enable analog signal storage, to provide channel selection, to provide jammer suppression, to provide a "feedforward" variable gain control path, and the like. An exemplary detection process in accordance with various exemplary embodiments may be performed in an analog only configuration using a threshold comparator. It will be appreciated that such an analog only mode would not make use of an ADC directly. An exemplary processor may play a role in the detection process to, for example, actively control the analog reference voltage associated with detection comparators used to make the detection decisions. Alternatively, the output of the log amps may be digitized and the detection decision may be made in an all digital fashion. As noted above, a draw back of an all-digital architecture is that high speed ADCs and a high performance processor are required leading to relatively high expenses. An additional problem associated with the use of an all digital path and a processor is the significant delay associated with digital sampling and decision making.

In accordance with various exemplary embodiments, an analog comparator may be used having a processor-controlled threshold. The exemplary analog comparator may further be equipped with a digital override to allow a fast initial decision to be made based on analog detection, while providing a slower more accurate and controllable final decision to be made using the processor. For example, when a signal from an interferer is detected, and the processor recognizes that the packet duration is longer than the wireless protocol will allow, the AGC and/or the detector may be forced by the processor to turn off the output signal transmission. It will be appreciated that the AGC gain setting may be directly controlled and overridden providing usefulness in situations including detection of system feed-back oscillations, detection or occurrence of a false alarm, detection of interference, expiration of valid packet intervals and the like.

The use of analog detection and initial control allows for low latency detection and system configuration, while the use of a processor allows the additional robust control. Algorithms for achieving control may include characterization and assessment of interference from different devices, establishment of initial system configuration, decoding of potential repeater control commands, the determination of system oscillations, and the like.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention

DETAILED DESCRIPTION OF THE INVENTION

Figure 1:
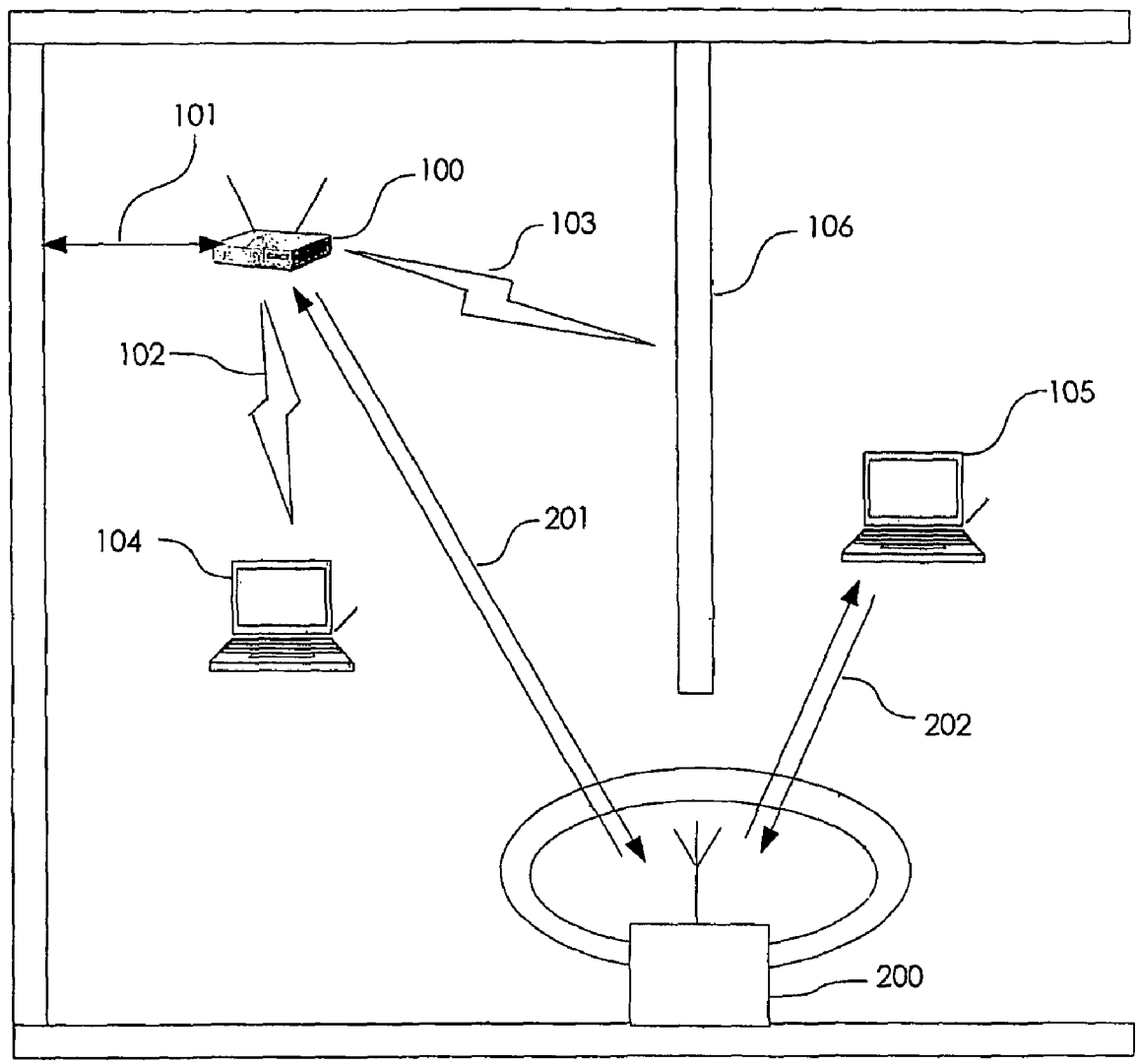
FIG. 1 is a diagram illustrating a WLAN including an exemplary repeater having automatic gain control in accordance with various exemplary embodiments.

Referring now to FIG. 1, a wide area connection 101, which could be, for example, an Ethernet connection, a T1 line, a wideband wireless connection or any other electrical connection providing a data communications path, may be connected to a wireless gateway, or access point (AP) 100. The wireless gateway 100 sends RF signals, such as IEEE 802.11 packets or signals based upon Bluetooth, Hyperlan, or other wireless communication protocols, to client units 104, 105, which may be personal computers, personal digital assistants, or any other devices capable of communicating with other like devices through one of the above mentioned wireless protocols. Respective propagation, or RF, paths to each of the client units 104, 105 are shown as 102, 103.

While the signal carried over RF path 102 is of sufficient strength to maintain high-speed data packet communications between the client unit 104 and the wireless gateway 100, the signals carried over the RF path 103 and intended for the client unit 105 would be attenuated when passing through a structural barrier such as walls 106 or 107 to a point where few, if any, data packets are received in either direction if not for a wireless repeater 200, the structure and operation of which will now be described.

To enhance the coverage and/or communication data rate to the client unit 105, wireless repeater 200 receives packets transmitted on a first frequency channel 201 from the wireless gateway 100. The wireless repeater 200, which may be housed in an enclosure typically having dimensions of, for example, 2.5"×3.5"×5", and which preferably is capable of being plugged into a standard electrical outlet and operating on 110 V AC power, detects the presence of a packet on the first frequency channel 201, receives the packet and re-transmits the packet with more power on a second frequency channel 202. Unlike conventional WLAN operating protocols, the client unit 105 operates on the second frequency channel, even though the wireless gateway 100 operates on the first frequency channel. To perform the return packet operation, the wireless repeater 200 detects the presence of a transmitted packet on the second frequency channel 202 from the client unit 105, receives the packet on the second frequency channel 202, and re-transmits the packet on the first frequency channel 201. The wireless gateway 100 then receives the packet on the first frequency channel 201. In this way, the wireless repeater 200 is capable of simultaneously receiving and transmitting signals as well as extending the coverage and performance of the wireless gateway 100 to the client unit 105.

To address the difficulties posed by obstructions as described above and attendant attenuation of the signal strength along obstructed paths and thus to enhance the coverage and/or communication data rate to client unit 105, exemplary wireless repeater 200, as shown in FIG. 1, may be used to retransmit packets beyond a range limited by propagation path constraints through, for example, frequency translation. Packets transmitted on a first frequency channel 201 from AP 100 are received at repeater 200 and re-transmitted, preferably with a greater power level, on a second frequency channel 202. Client unit 105 preferably operates on second frequency channel 202 as if AP 100 were also operating on it, such as with no knowledge that AP 100 is really operating on first frequency channel 201 such that the frequency translation is transparent. To perform return packet operations, repeater unit 200 detects the presence of a transmitted return packet on second frequency channel 202 from client unit 105, and is preferably configured to receive the packet on second frequency channel 202, and to retransmit the data packet to, for example AP 100, on first frequency channel 201.

Wireless repeater 200 is preferably capable of receiving two different frequencies simultaneously, such as first frequency channel 201 and second frequency channel 202 determining which channel is carrying a signal associated with, for example, the transmission of a packet, translating from the original frequency channel to an alternative frequency channel and retransmitting the frequency translated version of the received signal on the alternative channel. Details of internal repeater operation may be found in co-pending PCT Application No. PCT/US03/16208.

Repeater 200 may thus receive and transmit packets at the same time on different frequency channels thereby extending the coverage and performance of the connection between AP 100 and client unit 105, and between peer-to-peer connections such as from one client unit to another client unit. When many units are isolated from one another, repeater unit 200 further acts as a wireless bridge allowing two different groups of units to communicate where optimum RF propagation and coverage or, in many cases, any RF propagation and coverage was not previously possible.

Figure 2:
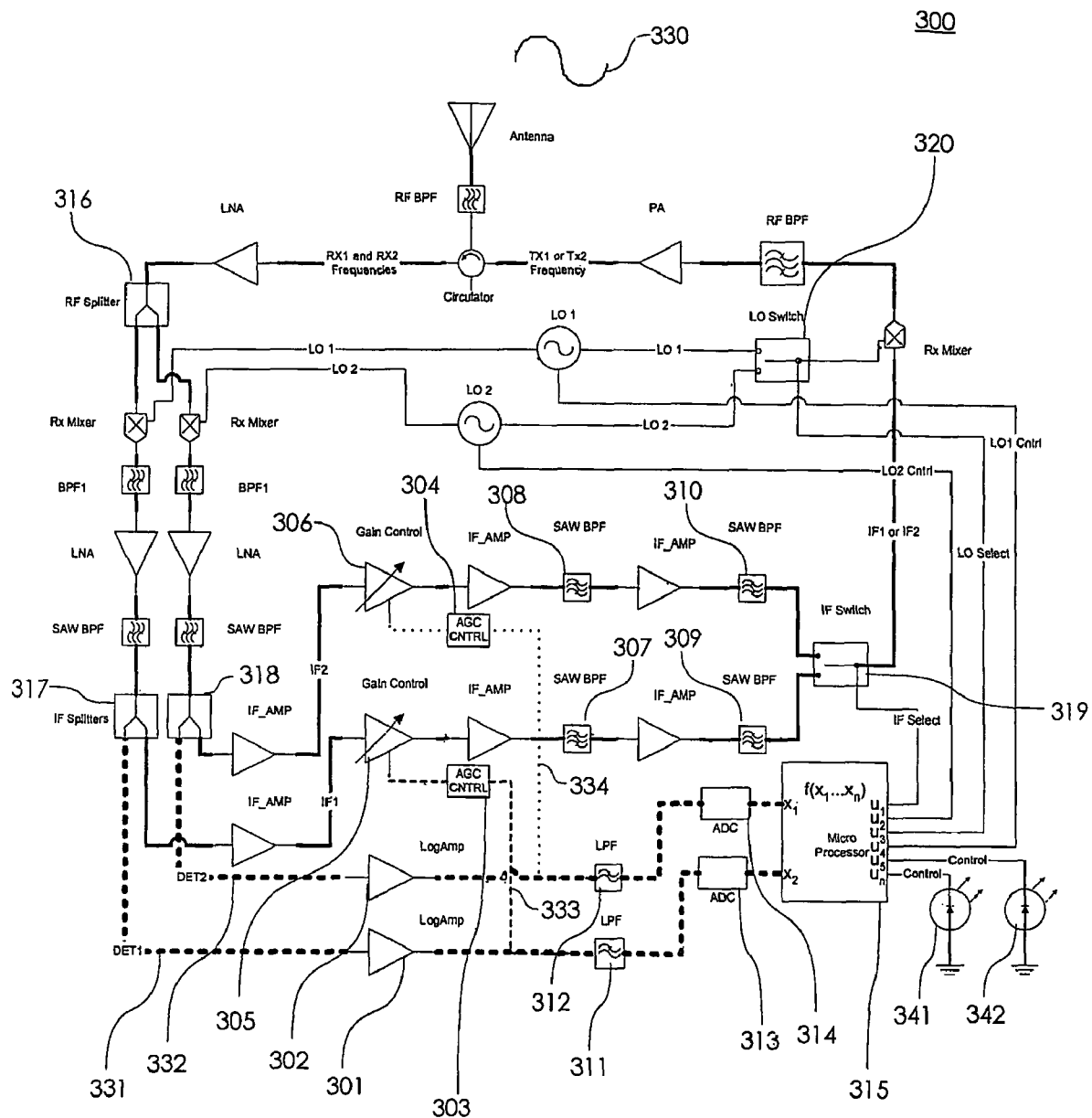
FIG. 2 is a schematic drawing illustrating an exemplary gain control circuit associated with an exemplary repeater of FIG. 1.

In accordance with various exemplary embodiments, repeater 200 is preferably configured to receive a signal and translate the frequency of the received signal with very little distortion or loss of the signal by properly controlling the gain of an exemplary transceiver section via Automatic Gain Control (AGC) circuitry (301-306) shown, for example, in FIG. 2. In a preferred embodiment, wireless repeater 200 shown is capable of receiving two different frequencies simultaneously, determining which one is present, translating the frequency of the one that is present to the other frequency and retransmitting a frequency translated version of the received signal.

In accordance with one preferred exemplary embodiment, AGC circuitry (301-306) utilizes RF delay and filter elements 307-310 to allow analog storage of an exemplary received waveform while signal detection and transmitter configuration takes place. It should be noted that signal detection may occur both prior to and during transit of signals in RF delay elements 307-310 providing time to perform system configuration. It should be noted that a detector power level is preferably used to set a gain value on a parallel signal path as part of the gain control operation.

More specifically, the AGC circuitry includes logarithmic amplifiers 301 and 302, AGC control circuits 303 and 304, gain control elements 305 and 306, which may preferably include variable gain or variable attenuator elements, and RF delay elements 307-310 which may preferably include analog storage devices such as, for example, delay lines and/or band pass filters. Low pass filter 311 and 312, and analog to digital converter (ADC) 313 and 314 are further preferably used to accomplish gain control under the direction and control of, for example, processor 315.

Since repeater 200 is configured to simultaneously detect and process two different frequency signals, received signal 330 is split and propagated on two different RF paths, for example, using RF splitter 316. Likewise, because the two different frequency paths must be delayed and controlled separately, each signal path is further split by, for example, IF splitters 317 and 318. One of the split signal outputs from IF splitter 317 is preferably coupled to logarithmic amplifiers 301 and the other split signal output is preferably coupled to gain control elements 305. Likewise, one of the split signal outputs from IF splitter 318 is preferably coupled to logarithmic amplifiers 302 and the other split signal output is preferably coupled to gain control elements 306. The output of logarithmic amplifiers 301 is fed to AGC control circuit 303 and low pass filter 311. Likewise, the output of logarithmic amplifiers 302 is fed to AGC control circuit 304 and low pass filter 312. It should be noted that while logarithmic amplifiers 301 and 302 preferably provide an output voltage proportional to the logarithm of the power of received signal 330, tracking the envelope thereof, other devices known to those of ordinary skill in the art may also be used to track the envelope or samples of the envelope directly or proportionately.

The basic operation of components along the detection path of received signal 330 such as, for example, low pass filters 311 and 312, analog-to-digital converters (ADC) 313 and 314, and processor 315 for example, would be readily apparent to those of ordinary skill in the art and thus a detailed review of the basic operation thereof is omitted, such operation is disclosed in detail in commonly assigned co-pending PCT Patent Application No. PCT/US03/16208. However it should be briefly noted that processor 315 preferably detects the presence of an IF signal on detection paths DET1 331 and DET2 332. As described in the above identified co-pending application, signal detection may be based on the signal level exceeding a threshold using, for example, analog or digital signal comparison implements in processor 315, or could be performed by other means well known to those of ordinary skill in the art. Once the signal is detected, gain control is applied to the signal using for example, AGC control circuits 303 and 304 on IF path IF1 333 or IF2 334 respectively, depending on the channel.

With reference still to FIG. 2 of the drawings, gain control is applied to signals on IF paths IF1 333 and IF2 334 using AGC control circuits 303 and 304 which circuits provide, inter alia, filtering of the analog voltage at the output of, for example, logarithmic amplifiers 301 and 302, any DC offset adjustment which may be necessary, AGC set point reference and control, level shifting/scaling, any required polarity reversal, and the like as would be appreciated by one of ordinary skill in the art. The output of AGC control circuits 303 and 304 are fed to gain control elements 305 and 306 which may provide either adjustable gain or adjustable attenuation of received signal 330 based on a value associated with, for example, the desired transmitter output power. It should be noted that AGC control circuits 303 and 304 may be one of a variety of gain control circuits, devices, or the like, as would be well known to those of ordinary skill in the art.

As an example of gain control in accordance with various exemplary embodiments, a variable attenuator could be used for gain control element 305 under the following conditions: desired output power +15 dBm, received signal power −80 dBm, total transceiver losses 65 dB, total transceiver gains 165 dB.

Under these conditions, a variable attenuator associated with, for example, gain control element 305, should be set according to the relation: Rx Signal Power−Desired Output Power+Total Gains−Total Losses, thus the attenuation would be −80 dBm−15 dBm+165 dB−65 dB resulting in 5 dB of attenuation. It will be appreciated that a voltage may be calculated and applied to the gain control element 305, for example, by AGC control circuit 303 resulting in the desired 5 dB attenuation setting. It should also be noted that while AGC control circuit 303 and gain control element 305 are described herein, the above description applies to the operation of AGC control circuit 304 and gain control element 306.

Thus, receive signal 330 in order to be retransmitted in accordance with various exemplary embodiments, and in accordance with the present example, is preferably output from gain control element 305 and delayed via Surface Acoustic Wave (SAW) filters 308 and 310. It will be appreciated that the delay introduced by SAW filters 308 and 310 acts to essentially store the analog waveform while AGC and signal detection processes, for example as described above, are carried out, meaning that detection and gain control setting are preferably completed during the propagation interval of the signal.

In accordance with various exemplary and preferred exemplary embodiments, RF delays are imposed through SAW filters 307-310 enabling analog signal storage and channel selection, jammer suppression, and a feed-forward variable gain control path. AGC control circuits 303 and 304 and gain control elements 305 and 306 may be biased or otherwise set under control of for example processor 315, which is preferably a processor, such as a general purpose processor, dedicated processor, signal processing processor, or the like as would be understood by one of ordinary skill in the art. Further, set points may be obtained by processor 315 from a look up table or the like depending on which channel received signal 330 is received on and which channel is selected for signal retransmission. It should be noted that different bands have different transmit power limitations in different countries, thus the selection of gain set points may be driven by several factors resulting from the need to meet FCC requirements and related specifications for the desired band such as spectral re-growth and Effective Isotropic Radiated Power (EIRP).

After detection and setting of the gain control, IF switch 319 and LO switch 320 are preferably set to retransmit received signal 330 at a different frequency without significantly cutting off the waveform preamble. It is important to note that detection and power sensing, for example, as described above, is preferably performed on detector paths DET1 331 and DET2 332, but actual gain control may be applied the on IF paths IF1 333 and IF2 334. More specifically referring again to FIG. 2, outputs from the logarithmic amplifiers 301 and 302 are fed to AGC control circuits 303 and 304 which circuits are making adjustments either as variable gain or attenuation with regard to gain control elements 305 and 306.

One factor in determining a sequence of signal detection and gain control is the effect caused by splitting the output voltage from logarithmic amplifiers 301 and 302 into a signal detection path and a gain control path, each having potentially two different filter bandwidths. As can be noted from FIG. 2, the gain control path is the path to AGC control circuits 303 and 304, while the signal detection path is the path leading to low pass filters 311 and 312, as previously described. Thus, if desired, the AGC control values and the signal detection filter bandwidth could be set differently. For example, the AGC control loop could be set to react very quickly to the incoming power envelop while signal detection, as carried out, for example, in ADC 313 and 314 and processor 315, could be configured to react more slowly. As a result, received signal 330 propagating in gain control elements 305 and 306 can be tracked very accurately while the portion of received signal 330 propagating in ADC 313 and 314 and processor 315 may track more slowly, but with more detection process gain.

It should be noted that in accordance with various exemplary and preferred exemplary embodiments, two separate detectors are used for performing detection of the presence of received signal 330 and for detection of the power level thereof in order to set gain. Thus, since signal detection may occur more slowly than AGC as described, different signal detection and AGC filter bandwidths may be used beneficially, allowing variable control elements associated with AGC such as gain control elements 305 and 306 to have a faster or slower response than the output of filters 311 and 312.

Another factor in controlling gain is the relative distance between the receive and transmit channels. Specifically, depending on the distance therebetween, the target output power or set point from the gain control elements 305 and 306 can be different to the extent that additional performance may be gained when the receive and transmit channels are further apart in frequency. Gain values may be increased in gain control elements 305 and 306 while continuing to meet performance requirements. Further, AGC control circuits 303 and 304 may be programmed to increase power based on the frequency difference or, alternatively, processor 315 may be programmed to control AGC control circuits 303 and 304 based on frequency separation. Adjusting set points based on frequency separation may further include applying more filtering to any leakage signals picked up by a receiver to avoid self interference.

A factor affecting the choice of which channels to operate on during initial repeater power up may be influenced by choosing repeating channels based on the ability to transmit more power in different FCC bands or bands controlled by other regulatory bodies. For example, in the U-NII bands for operation in the United States, the maximum allowable transmit power for CH36-48 is 50 mW, for CH52-64 is 250 mW, and for CH149-161 is 1 W. Therefore it is possible to receive a signal in on a channel associated with one of the lower power bands and choose a channel on a different band allowing higher transmit power, thereby allowing a higher AGC set point. Thus the set points for a translation, say from F1 to F2 and F2 to F1 would be different. The decision of which channels to select is preferably pre-programmed during manufacturing, or, alternatively could be programmed in the field, in, for example, AGC control circuits 303 and 304 or processor 315.

In accordance with other aspects of the present invention, gain control may require AGC calibration during initial manufacturing. Calibration may be desirable to allow the use of lower tolerance parts thus reducing cost. Calibration may further provide for accuracy required for regional or band specific power settings. Accordingly, calibration may include setting up circuits and devices in accordance with one or more of the following; regional regulatory rules, frequency channel, received power level, transmit power level, temperature, and the like. In accordance with various exemplary and preferred exemplary embodiments, repeater 200 using, for example, processor 315, may store calibration tables and the like and be configured, for example through the use of software, programs, instructions or the like, to pass specific calibration values to AGC control circuits 305 and 306. Processor 315 would preferably utilize a digital to analog conversion process to control the set point.

As mentioned above, different detector outputs may be used for AGC and signal detection. Signal detection may be performed in an analog only configuration using, for example, a threshold comparator under the control of processor 315 which may be configured to actively control, for example, an analog reference voltage a threshold comparator uses to make the detection decision. Alternatively, received signal 330 may be digitized and a detection decision made, for example, in processor 315. One concern related to using a digital path and processor 315 includes delay associated with, for example, digital sampling and decision-making instructions in a processor 315.

In accordance with various alternative exemplary embodiments an analog comparator (not shown) having a threshold controlled by processor 315 may be used. Such a configuration could be equipped with a digital override to allow for a fast initial decision, converging to a slower more accurate and controllable decision using software, programs, instructions, and the like readable and executable by processor 315. For example, if an interferer is detected, and processor 315 recognizes that the packet duration is longer than the wireless protocol will allow, AGC control circuits 303 and 304 and/or detector could be turned off by processor 315 to prevent signal transmission. Thus the normal AGC setting may be directly controlled and overridden. Such control is further useful in situations including when a system feed-back oscillation is detected.

Figure 3:
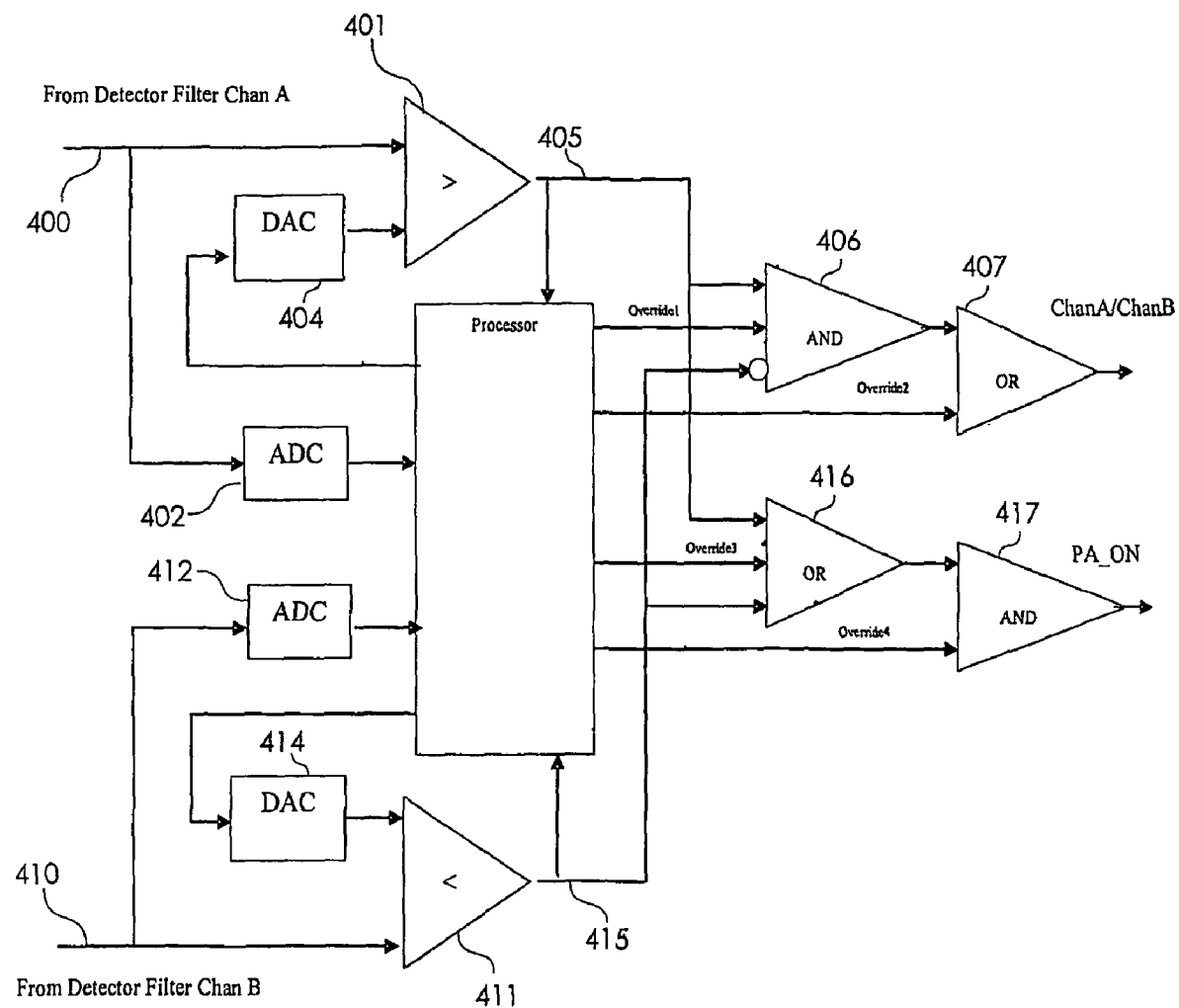
FIG. 3 is a schematic drawing illustrating an exemplary detector circuit associated with an exemplary repeater of FIG. 1 and FIG. 2.

In addition to AGC control, and detection as illustrated and described with reference FIG. 2, an alternative to detector processing block is depicted in FIG. 3. It will be appreciated that inputs 400 and 401 are preferably coupled with the outputs of filter 311 and filter 312 replacing ADC 313 or 314 and, at least for detection purposes, processor 315. It should be noted that while the exemplary detection circuit shown in FIG. 3 is indicated to replace processor 315 for purposes of performing digital detection, processor 315 in accordance with various exemplary embodiments remains present in frequency translating repeater 200 for performing other functions as will be described herein. It will further be appreciated that the exemplary circuit illustrated in FIG. 3 may be replicated twice, once for each of the detector paths leading from 313 and 314.

Thus, inputs 400 and 410 are preferably coupled to threshold comparators 401 and 411 respectively. The reference threshold of comparators 401 and 411 is preferably set by digital to analog converters (DAC) 404 and 414 which may be internal to the processor 315 or may be provided externally, and may further be simple pulse width modulators or pulse density modulators. DAC 404 and DAC 414 are preferably controlled by processor 315 and are preferably programmed based upon factors such as, for example, a probability of detection and a probability of false detection as derived by various algorithms known to those of ordinary skill in the art.

It will be appreciated that detection algorithms may be based on a statistical analysis of samples of a received signal at ADCs 402 and 412 and can include level crossing rates, average multipliers, and the like. Alternatively a SAW tooth control algorithm may be used to observe the "qualified" false detection rate, for example, on comparator 401 and 411. The SAW tooth control algorithm works by determining when a false detection has occurred and further qualifying the false detection using known parameters of the relevant packet protocol, such as packet duration and the like. If a threshold is crossed for only short periods of time, shorter than the packet duration, a false detection is most probable. It should be noted that valid ranges for packet durations are defined in accordance with protocol standards and specifications, such as 802.11 and the like. If a detection interval is too short, the detection cannot be associated with a valid 802.11 packet. If a detection interval is too long, the detection cannot be associated with a valid 802.11 packet either.

Accordingly, it would be likely that in such situations, the detection threshold is set too low, interference may be present, the repeater could be oscillating, or the like. A SAW tooth control algorithm adds an increment to the threshold for the comparator every time a false detection occurs, then subtracts a small amount from the threshold every time there is no detection. It will be appreciated that the relative increments and decrements of the detection threshold level will determine the false alarm rate, and the time constant of the resulting control loop. While SAW tooth control schemes have been effectively used in reverse link "outer loop power control" in, for example, IS-95 CDMA base stations, the application of a SAW tooth control loop to detection in accordance with various exemplary embodiments, provides advantages not previously appreciated.

Once reliable detection thresholds are set, two control lines may be output in connection with the "fast detect" analog circuitry. Channel A/Channel B line is preferably output from OR element 407 for controlling switches in FIG. 3 which determine which IF channel is up-converted and transmitted. The other control line PA_ON is preferably output from AND element 417, and may be used to enable, disable, or otherwise control the output of the transmitter by enabling or disabling the power amplifier. It should be noted that OR element 407 and AND element 417 are provided to allow processor 315 a final degree of control over the respective outputs through override signals. Actual generation of logic levels associated with detection is preferably performed by AND element 406 and OR element 416. For PA control, outputs of comparators 401 and 411 are input to OR function 416.

For Channel A and Channel B detection, output signal 415 from comparator 411 is coupled to into an inverting input of AND element 406 resulting in an input which is "active low" and will produce a logic 0 on the output of AND element 406 when a signal is present on channel B. When a signal is present on channel A, output signal 405 from comparator 401 will be active and preferably a logic 1 or high level, producing a logic 1 or high level on the output of AND 406 provided that input "Override 1" is present. Override 1 signal preferably allows the processor to directly control the A/B line despite the presence or absence of signals. For example, if Override 1 is set low, the output will be forced to a low output indicative of channel B detection. If Override 1 is set high, AND element 406 will operate normally. To force the selection of Channel A, processor 315 preferably activates Override 2 which is input to OR element 407 forcing the output high indicative of channel A detection.

It will be appreciated that the functioning of the PA_ON may be controlled by processor 315. Override 3 signal can be set to force the PA_ON into the high or ON position. OR element 416 provides a high or ON output for PA_ON when a signal is detected and an output generated on either comparator 401 or 411. AND element 417 provides a mechanism in connection with Override 4 signal, for processor 315 to force PA_ON into an off, or disabled state. Processor 315 may further force PA_ON into an on state even when no signal is present through the use of Override 3. It will be appreciated that while the above described override and enabling functions are preferably provided by AND elements 406 and 417 and OR elements 416 and 407, they may be implemented in other ways. For example, the Channel A/Channel B line may generated as an analog comparator output with inputs connected to analog detectors outputs 400 and 410, and the PA_ON signal may be generated as a combination of detector outputs 400 and 410 and a single threshold detector.

Figure 4:
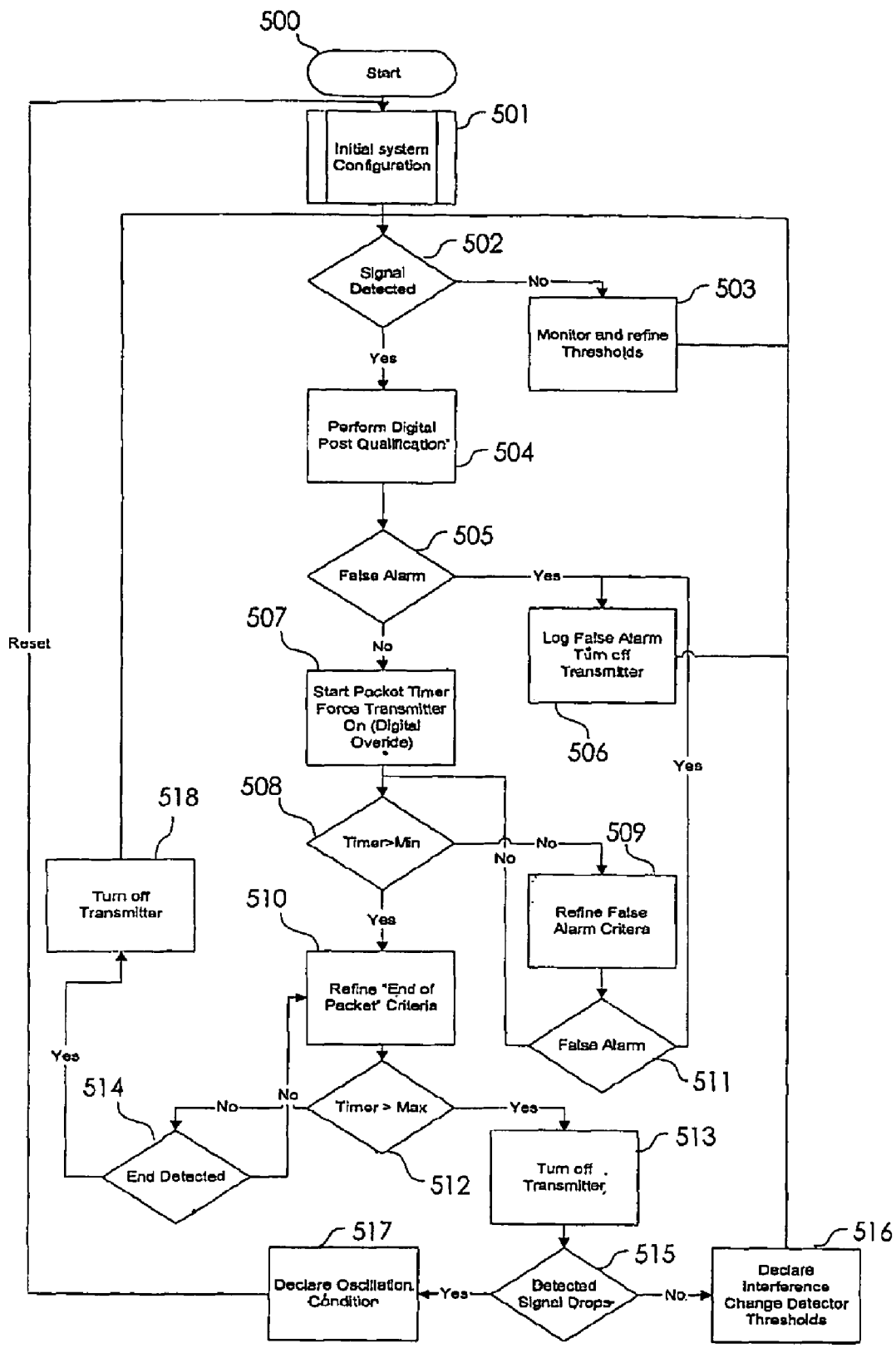
FIG. 4 is a flow chart illustrating an exemplary detection procedure associated with various embodiments of an exemplary repeater.

It should be noted that the above description represent one example demonstrating various control functions capable of facilitating the integration of a fast fixed analog detection and a slow more intelligent digital detection. A flowchart is shown in FIG. 4, depicting an exemplary control algorithm which may preferably be implemented in the processor 315 in FIG. 2. Upon power-up processor 315 begins operation at 500, performing various initial system configuration tasks in 501. It will be appreciated that start-up tasks could include power-on self-tests, initial channel selection, and repeater calibrations. Next, flow passes to normal operation with decision 502. If no signal is present on either of the detectors, processor 315 will monitor the detectors and refine the threshold settings. It should be noted that there are two preferable approaches to refining detection and thresholding algorithms. First, if processor 315 uses ADCs to monitor detector signals, a statistical analysis may be performed to set the threshold directly. If the comparator output only is monitored, qualified false detection may be used in accordance with the above described saw tooth algorithm. A combination of saw tooth algorithms may further be used to improve the quality of detection. For example, a saw tooth based on false alarm rates may be combined with a faster statistical approach associated with a short-term level adjustment based on a direct measurement. It should be noted that with direct measurement techniques, a sampling rate associated with the ADCs is not required to meet conventional Nyquist criteria required to reconstruct a signal. Instead, since samples are being used only for statistical analysis, a significantly lower sampling rate may be used allowing low cost processors to be used, including integrated low speed ADCs.

As thresholds associated with comparators 401 and 411 are refined and set by processor 315, first in initial system configuration 501 and then refined for example, at 503, signal detection continues at 502. When a signal is detected, a post qualification is preferably performed in one of several ways at 504. One technique involves monitoring the output of comparators 401 and 411 for a predetermined duration, such as an expected packet interval, to ensure valid detection continues to be present. Another technique may involve sampling the comparator input, for example using ADC 402 and 412, and determining how far above the threshold the signal is providing a further level of confidence that the initial detection is not a false alarm. During detection at 502, one of comparators 401 and 411 have already been configured to begin transmission of the information contained in the signal, such as a packet, independent of processor 315. Post qualification at 504, thus ensures that no mistake in detection has been made, and to provide a corrective mechanism if one has. While digital processing is slower than fast analog detection, it is less prone to system noise. Therefore, once a detected signal is post qualified, control of the transmitter will be taken away from analog circuits and overridden by processor 315 providing faster transmitter turn on, and robust detection which is less sensitive to signal detection anomalies. Further, since transmitter turn off is not as time critical as transmitter turn on, it can be performed by processor 315 alone. If post qualification testing determines that the detection was a false alarm at 505 the transmitter is preferably turned off at 506, and the false alarm will be logged. It should be noted that information obtained from the logging of false alarms may be used, for example, by processor 315 to cause a change in the threshold, in accordance with the saw tooth algorithm described herein above. Alternatively, logged information may be used for performance analysis.

If detection is valid and not determined to be a false alarm, a packet timer may be started and a digital override of the transmitter performed at 507 to "lock" it on, providing a reduction of sensitivity to noise in a low signal strength environment. The packet timer will be useful to determine if the duration of the received transmission is within reasonable and valid time limits within the scope of various standards, like 802.11, wherein packets have a specified minimum and a maximum duration in time. It will be appreciated that packet duration time limits may be used to qualify a received transmission to determine if a packet duration is valid or invalid. If the packet duration as determined by the packet timer is too short, the detected signal was either a random false detection caused by noise or the like, RADAR, or other interference as will be appreciated by those of ordinary skill. If the packet duration as determined by the packet timer is too long, the detected signal may be associated with interference such as would be caused by a cordless phone, microwave, or the like, or may be caused by an oscillation condition due, for example, to self-oscillation within the same repeater, or may be associated with a system oscillation as would result from two repeaters operating within range of each other. Thus, the timer is tested at 508 to determine if the minimum packet duration has elapsed. If not, and the signal continues to be present, false alarm criteria may be refined at 509 and the condition re-tested at 511, whereupon the timer may continue to be monitored at 508, criteria refined at 509, and false alarm condition re-tested at 511. If a false alarm due to early termination is detected, for example based on the signal no longer being present, as false alarm is logged and transmitter disabled at 506. If the minimum packet duration as measured by the timer has been exceeded in accordance with, for example, 802.11 or appropriate protocol at 508, new criteria for determining the occurrence of a valid end of packet may be refined at 510. If the timer indicates that the duration of signal detection has not exceeded the maximum possible packet duration at 512, end of packet criteria at 510 are used at 514 to determine if the packet has terminated. If not, criteria are further refined at 510 and timer re-tested at 512. If the end of packed it detected at 514, the transmitter is turned off and the signal detection process is started again at 502. If the timer exceeds the maximum packet duration, and signal continues to be present, the transmitter is turned off at 513.

Detectors are preferably monitored at 515 to determine if detection ceases. If so, it can be assumed that the detected signal was likely due to a system oscillation or a self-jamming condition at 517 and in which case repeater is preferably reconfigured and detection restarted at 501. If detection does not cease indicating that the signal has not dropped, then it can be assumed that the detected signal is likely an interferer, and the threshold is preferably modified at 516 to prevent the detection of interference, whereupon processor 315 preferably returns to normal detection at 502. It should be noted that in accordance with 802.11h, a requirement for detect RADAR is specified. Post analysis of the false detection conditions to characterize RADAR interferers may be incorporated in accordance with various exemplary embodiments. It will be appreciated that RADAR signals due to certain well-defined pulse durations and repetition profiles and the like may be easily characterized and false alarms associated with RADAR easily detected, for example, in post-qualification at 504.

One of ordinary skill in the art will recognize that as noted above, various techniques can be used to determine different signal detector configurations and set detection thresholds and the like in the present invention. Additionally, various components, such as detector elements 401 and 411, logic elements 406, 407, 416, and 417, DACs 404, 414, ADCs 402, 412 and the functionality of processor 315 and other elements could be combined into a single integrated device. Other changes and alterations to specific components, and the interconnections thereof, can be made by one of ordinary skill in the art without deviating from the scope and spirit of the present invention.

What is claimed is:

1. A method for detecting the presence of a signal on one of at least two frequency channels in a frequency translating repeater for use in wireless local area network (WLAN) operating according to a protocol, the method comprising:
    establishing a first threshold associated with a first of the at least two frequency channels and a second threshold associated with a second of the at least two frequency channels;
    monitoring the first and second frequency channels to detect the signal thereon in accordance with a first detection mode including the first threshold and the second threshold; and
    qualifying, when the signal is detected, to determine whether the detected signal is a wanted signal or an unwanted signal, wherein the qualifying further comprises
    measuring an elapsed time associated with the detected signal, if the detected signal is the wanted signal;
    refining at least one of a first or a second criteria based upon a threshold event, wherein the first criteria is refined if the threshold event is the elapsed time being greater than a minimum value and the second criteria is refined if the threshold event is the elapsed time being not greater than the minimum value.

2. The method according to claim 1, wherein the establishing the first and the second thresholds includes establishing the first and the second thresholds using a saw tooth process.

3. The method according to claim 1, further comprising adding a delay to the signal after the signal is detected, and wherein a detection bandwidth associated with the monitoring is less than a group delay associated with the signal.

4. The method according to claim 3, wherein the delay is less than a timeout parameter associated with the protocol.

5. The method according to claim 1, further comprising refining the first threshold and the second threshold if no signal is detected.

6. The method according to claim 1, wherein the first detection mode includes an analog detection mode.

7. The method according to claim 1, further comprising recording information associated with the detected signal in an event log if the detected signal is determined to be the unwanted signal.

8. The method according to claim 7, further comprising disabling a transmission of the signal if the detected signal is determined to be the unwanted signal.

9. The method according to claim 7, further comprising refining the first and the second threshold using the recorded information.

10. The method according to claim 1, further comprising monitoring the first and second frequency channels to detect a signal thereon in accordance with a second detection mode including the first threshold and the second threshold when the detected signal is detected.

11. The method according to claim 10, wherein the second detection mode includes a digital detection mode.

12. The method according to claim 1, further comprising overriding the first detection mode with a second detection mode.

13. The method according to claim 1, wherein the qualifying includes:
    starting a timer to measure the elapsed time; and
    enabling a transmission of the detected signal in accordance with an override mode.

14. The method according to claim 1, wherein the minimum value includes a minimum packet duration.

15. The method according to claim 1, wherein the first criteria includes an end of packet criteria and the second criteria includes an unwanted signal criteria.

16. The method according to claim 1, wherein each threshold is established based upon a probability of a false detection of the signal.

17. A method for detecting the presence of a signal on one of at least two frequency channels in a frequency translating repeater for use in wireless local area network (WLAN) operating according to a protocol, the method comprising:
    establishing a first threshold associated with a first of the at least two frequency channels and a second threshold associated with a second of the at least two frequency channels;
    monitoring the first and second frequency channels to detect the signal thereon in accordance with a first detection mode including the first threshold and the second threshold; and
    qualifying, if the signal is detected, to determine whether the detected signal is a wanted signal or an unwanted signal, wherein the qualifying further comprises
    measuring an elapsed time associated with the detected signal, if the detected signal is the wanted signal;

refining at least one of a first or a second criteria based upon a threshold event; wherein the first criteria is refined if the threshold event is the elapsed time being not greater than a maximum value; and disabling the transmission if the threshold event is the elapsed time being greater than a minimum value.

18. An apparatus for detecting the presence of a signal on one of at least two frequency channels in a frequency translating repeater for use in wireless local area network (WLAN) operating according to a protocol, the apparatus comprising:
a radio frequency interface;
a processor; and
a memory coupled to the processor and the radio frequency interface, the memory containing instructions for causing the processor to:
establish a first threshold associated with a first of the at least two frequency channels and a second threshold associated with a second of the at least two frequency channels;
monitor the first and second frequency channels to detect the signal thereon in accordance with a first detection mode including the first threshold and the second threshold; and
qualify, if the signal is detected, to determine whether the detected signal is a wanted signal or an unwanted signal, wherein the instructions for qualifying further cause the processor to
measure an elapsed time associated with the detected signal, if the detected signal is the wanted signal; and
refine at least one of a first or a second criteria based upon a threshold event, wherein the first criteria is refined if the threshold event is the elapsed time being greater than a minimum value and the second criteria is refined if the threshold event is the elapsed time being not greater than the minimum value.

19. The apparatus according to claim 18, wherein the instructions further cause the processor, in establishing the first and the second thresholds, to establish the first and the second thresholds using a saw tooth process.

20. The apparatus according to claim 18, wherein the instructions further cause the processor to add a delay to the signal after the signal is detected, and wherein a detection bandwidth associated with the monitoring is less than a group delay associated with the signal.

21. The apparatus according to claim 20, wherein the delay is less than a timeout parameter associated with the protocol.

22. The apparatus according to claim 18, wherein the instructions further cause the processor to refine the first threshold and the second threshold if no signal is detected.

23. The apparatus according to claim 18, wherein the first detection mode includes an analog detection mode, not involving the processor directly.

24. The apparatus according to claim 18, wherein the instructions further cause the processor to record information associated with the detected signal in an event log if the detected signal is determined to be the unwanted signal.

25. The apparatus according to claim 24, wherein the instructions further cause the processor to disable a transmission of the signal over the radio frequency interface if the detected signal is determined to be the unwanted signal.

26. The apparatus according to claim 24, wherein the instructions further cause the processor to refine the first and the second threshold using the recorded information.

27. The apparatus according to claim 18, wherein the instructions further cause the processor to monitor the first and second frequency channels to detect a signal thereon in accordance with a second detection mode including the first threshold and the second threshold when the detected signal is detected.

28. The apparatus according to claim 27, wherein the second detection mode includes a digital detection mode.

29. The apparatus according to claim 18, wherein the instructions further cause the processor to override the first detection mode with a second detection mode.

30. The apparatus according to claim 18, wherein the instructions for qualifying further cause the processor to:
start a timer to measure the elapsed time; and
enable a transmission of the detected signal in accordance with an override mode.

31. The apparatus according to claim 18, wherein the minimum value includes a minimum packet duration.

32. The apparatus according to claim 18, wherein the first criteria includes an end of packet criteria and the second criteria includes an unwanted signal criteria.

33. The apparatus according to claim 18, further comprising an IF unit, capable of down-converting the signal on an RF band and selecting one of the first and the second frequency channels for transmission.

34. The apparatus according to claim 33, wherein the IF unit is configured to filter the down converted signal.

35. The apparatus according to claim 33, wherein the IF unit is configured to add a delay to the down converted signal during a period the signal is not detected and prior to enabling a transmission.

36. The apparatus according to claim 35, further comprising a surface acoustic wave (SAW) filter and wherein the delay is added using the SAW filter.

37. The apparatus according to claim 18, further comprising a detection unit associated with each of the at least two frequency channels.

38. The apparatus according to claim 37, wherein the detection unit includes at least one of: a diode detector at an intermediate frequency (IF), a diode detector at a base band frequency, a matched filter at the IF, a matched filter at a radio frequency (RF).

39. The apparatus according to claim 37, further comprising a converter to digitize the signal to form a digitized signal and wherein the detector unit is further configured to detect the digitized signal.

40. The apparatus according to claim 37, wherein the detection unit is further configured to:
compare a power level associated with the signal;
monitor the signal over a time interval to determine a noise estimate; and
comparing the current signal power to this estimate as part of the detection process.

41. The apparatus according to claim 40, wherein the detection unit is further configured to monitor the noise level of both of the at least two frequency channels at the same time.

42. The apparatus according to claim 40, further comprising a converter, and wherein the detection unit is further configured to monitor the noise level by under-sampling the converter.

43. An apparatus for detecting the presence of a signal on one of at least two frequency channels in a frequency translating repeater for use in wireless local area network (WLAN) operating according to a protocol, the apparatus comprising:
a radio frequency interface;
a processor; and
a memory coupled to the processor and the radio frequency interface, the memory containing instructions for causing the processor to:

establish a first threshold associated with a first of the at least two frequency channels and a second threshold associated with a second of the at least two frequency channels;

monitor the first and second frequency channels to detect the signal thereon in accordance with a first detection mode including the first threshold and the second threshold; and qualify, if the signal is detected, to determine whether the detected signal is a wanted signal or an unwanted signal, wherein the instructions for qualifying further cause the processor to measure an elapsed time associated with the detected signal, if the detected signal is the wanted signal; and refine at least one of a first or a second criteria based upon a threshold event, wherein the first criteria is refined if the threshold event is the elapsed time being not greater than a maximum value and wherein the transmission is disabled if the threshold event is the elapsed time being greater than a minimum value.

44. An apparatus for detecting the presence of a signal on one of at least two frequency channels in a frequency translating repeater for use in wireless local area network (WLAN) operating according to a protocol, the apparatus comprising:

a radio frequency interface;

a processor; and a memory coupled to the processor and the radio frequency interface, the memory containing instructions for causing the processor to:

establish a first threshold associated with a first of the at least two frequency channels and a second threshold associated with a second of the at least two frequency channels;

monitor the first and second frequency channels to detect the signal thereon in accordance with a first detection mode including the first threshold and the second threshold; and qualify, if the signal is detected, to determine whether the detected signal is a wanted signal or an unwanted signal, wherein the instructions in causing the processor to qualify, further cause the processor to:

monitor the signal for a first period of time when the signal is above one of the first and the second thresholds; and integrate the signal for a second period of time prior to comparing the signal to the first and the second thresholds.

45. The apparatus according to claim 44, further comprising a converter for converting the signal to form a digitized signal, and wherein the instructions in causing the processor to monitor and integrate, further cause the processor to monitor the digitized signal and integrate the digitized signal.

46. The apparatus according to claim 44, further comprising a converter for converting the signal to form a digitized signal, and wherein the instructions in causing the processor to monitor and integrate, further cause the processor to monitor the signal and the digitized signal and integrate the signal and the digitized signal.

47. A non-transitory computer-readable medium comprising instructions, which, when executed by a machine, cause the machine to perform operations for detecting the presence of a signal on one of at least two frequency channels in a frequency translating repeater for use in wireless local area network (WLAN) operating according to a protocol, the instructions comprising:

instructions to establish a first threshold associated with a first of the at least two frequency channels and a second threshold associated with a second of the at least two frequency channels;

instructions to monitor the first and second frequency channels to detect the signal thereon in accordance with a first detection mode including the first threshold and the second threshold; and instructions to qualify, if the signal is detected, to determine whether the detected signal is a wanted signal or an unwanted signal, wherein the qualifying further comprises instructions to measure an elapsed time associated with the detected signal, if the detected signal is the wanted signal; and instructions to refine at least one of a first or a second criteria based upon a threshold event, wherein the first criteria is refined if the threshold event is the elapsed time being greater than a minimum value and the second criteria is refined if the threshold event is the elapsed time being not greater than the minimum value.

48. The non-transitory computer-readable medium according to claim 47, wherein the instructions to qualify includes:

instructions to start a timer to measure the elapsed time; and instructions to enable a transmission of the detected signal in accordance with an override mode.

49. The non-transitory computer-readable medium according to claim 47, wherein the minimum value includes a minimum packet duration.

50. The non-transitory computer-readable medium according to claim 47, wherein the first criteria includes an end of packet criteria and the second criteria includes an unwanted signal criteria.

51. A non-transitory computer-readable medium comprising instructions, which, when executed by a machine, cause the machine to perform operations for detecting the presence of a signal on one of at least two frequency channels in a frequency translating repeater for use in wireless local area network (WLAN) operating according to a protocol, the instructions comprising:

instructions to establish a first threshold associated with a first of the at least two frequency channels and a second threshold associated with a second of the at least two frequency channels;

instructions to monitor the first and second frequency channels to detect the signal thereon in accordance with a first detection mode including the first threshold and the second threshold; and instructions to qualify, if the signal is detected, to determine whether the detected signal is a wanted signal or an unwanted signal, wherein the qualifying further comprises instructions to measure an elapsed time associated with the detected signal, if the detected signal is the wanted signal;

instructions to refine at least one of a first or a second criteria based upon a threshold event, wherein the first criteria is refined if the threshold event is the elapsed time being not greater than a maximum value; and instructions to disable the transmission if the threshold event is the elapsed time being greater than a minimum value.

52. A non-transitory computer-readable medium comprising instructions, which, when executed by a machine, cause the machine to perform operations for detecting the presence of a signal on one of at least two frequency channels in a frequency translating repeater for use in wireless, local area network (WLAN) operating according to a protocol, the instructions comprising:
- instructions to establish a first threshold associated with a first of the at least two frequency channels and a second threshold associated with a second of the at least two frequency channels;
- instructions to monitor the first and second frequency channels to detect the signal thereon in accordance with a first detection mode including the first threshold and the second threshold;
- instructions to qualify, if the signal is detected, to determine whether the detected signal is a wanted signal or an unwanted signal;
- instructions to monitor the signal for a first period of time when the signal is above one of the first and the second thresholds; and
- instructions to integrate the signal for a second period of time prior to comparing the signal to the first and the second thresholds.

53. The non-transitory computer-readable medium according to claim 52, further including:
- instructions to convert the signal to form a digitized signal, and wherein the instructions to monitor and integrate, further include instructions to monitor the digitized signal and integrate the digitized signal.

54. The non-transitory computer-readable medium according to claim 52, further including:
- instructions to convert the signal to form a digitized signal, and wherein the instructions to monitor and integrate, further include instructions to monitor the signal and the digitized signal and integrate the signal and the digitized signal.

55. An apparatus for detecting the presence of a signal on one of at least two frequency channels in a frequency translating repeater for use in wireless local area network (WLAN) operating according to a protocol, the apparatus comprising:
- means for establishing a first threshold associated with a first of the at least two frequency channels and a second threshold associated with a second of the at least two frequency channels;
- means for monitoring the first and second frequency channels to detect the signal thereon in accordance with a first detection mode including the first threshold and the second threshold;
- means for qualifying, if the signal is detected, to determine whether the detected signal is a wanted signal or an unwanted signal, wherein the qualifying means further comprises
- means for measuring an elapsed time associated with the detected signal, if the detected signal is the wanted signal; and
- means for refining at least one of a first or a second criteria based upon a threshold event, wherein the first criteria is refined if the threshold event is the elapsed time being greater than a minimum value and the second criteria is refined if the threshold event is the elapsed time being not greater than the minimum value.

56. The apparatus according to claim 55, wherein the means for qualifying further comprises:
- means for starting a timer to measure the elapsed time; and
- means for enabling a transmission of the detected signal in accordance with an override mode.

57. The apparatus according to claim 55, wherein the minimum value includes a minimum packet duration.

58. The apparatus medium according to claim 55, wherein the first criteria includes an end of packet criteria and the second criteria includes an unwanted signal criteria.

59. An apparatus for detecting the presence of a signal on one of at least two frequency channels in a frequency translating repeater for use in wireless local area network (WLAN) operating according to a protocol, the apparatus comprising:
- means for establishing a first threshold associated with a first of the at least two frequency channels and a second threshold associated with a second of the at least two frequency channels;
- means for monitoring the first and second frequency channels to detect the signal thereon in accordance with a first detection mode including the first threshold and the second threshold;
- means for qualifying, if the signal is detected, to determine whether the detected signal is a wanted signal or an unwanted signal, wherein the qualifying means further comprises
- means for measuring an elapsed time associated with the detected signal, if the detected signal is the wanted signal;
- means for refining at least one of a first or a second criteria based upon a threshold event, wherein the first criteria is refined if the threshold event is the elapsed time being not greater than a maximum value; and
- means for disabling the transmission if the threshold event is the elapsed time being greater than a minimum value.

60. An apparatus for detecting the presence of a signal on one of at least two frequency channels in a frequency translating repeater for use in wireless local area network (WLAN) operating according to a protocol, the apparatus comprising:
- means for establishing a first threshold associated with a first of the at least two frequency channels and a second threshold associated with a second of the at least two frequency channels;
- means for monitoring the first and second frequency channels to detect the signal thereon in accordance with a first detection mode including the first threshold and the second threshold;
- means for qualifying, if the signal is detected, to determine whether the detected signal is a wanted signal or an unwanted signal;
- means for monitoring the signal for a first period of time when the signal is above one of the first and the second thresholds; and
- means for integrating the signal for a second period of time prior to comparing the signal to the first and the second thresholds.

61. The apparatus according to claim 60, further including:
- means for converting the signal to form a digitized signal, and
- wherein the means for monitoring and integrating, further include means for monitoring the digitized signal and for integrating the digitized signal.

62. The apparatus according to claim 60, further including:
- means for converting the signal to form a digitized signal, and
- wherein means for monitoring and for integrating, further include means for monitoring the signal and the digitized signal and means for integrate the signal and the digitized signal.

* * * * *